(12) United States Patent
Jovers et al.

(10) Patent No.: US 11,701,939 B2
(45) Date of Patent: Jul. 18, 2023

(54) METHOD AND DEVICE FOR DETERMINING AN AXLE LOAD ON A SUSPENDED VEHICLE

(71) Applicant: WABCO GmbH, Hannover (DE)

(72) Inventors: Ingo Jovers, Gehrden (DE); Johann Lucas, Sehnde (DE)

(73) Assignee: ZF CV Systems Europe BV, Brussels (BE)

( * ) Notice: Subject to any disclaimer, the term of this patent is extended or adjusted under 35 U.S.C. 154(b) by 294 days.

(21) Appl. No.: 16/770,768

(22) PCT Filed: Sep. 19, 2018

(86) PCT No.: PCT/EP2018/075344
§ 371 (c)(1),
(2) Date: Jun. 8, 2020

(87) PCT Pub. No.: WO2019/120652
PCT Pub. Date: Jun. 27, 2019

(65) Prior Publication Data
US 2020/0406700 A1    Dec. 31, 2020

(30) Foreign Application Priority Data
Dec. 19, 2017   (DE) ...................... 10 2017 011 753.5

(51) Int. Cl.
*B60G 17/015*   (2006.01)
*B60G 17/052*   (2006.01)

(52) U.S. Cl.
CPC ..... *B60G 17/0155* (2013.01); *B60G 17/0523* (2013.01); *B60G 2202/152* (2013.01);
(Continued)

(58) Field of Classification Search
None
See application file for complete search history.

(56) References Cited

U.S. PATENT DOCUMENTS

2001/0003386 A1\* 6/2001 Stiller ................ B60G 17/0155
                                                              267/64.16
2002/0038193 A1\* 3/2002 Grunberg ............... G01G 19/08
                                                                 701/37
(Continued)

FOREIGN PATENT DOCUMENTS

DE   19963402 A1   7/2001
DE   10127567 A1   12/2002
(Continued)

OTHER PUBLICATIONS

European Patent Office, Rijswijk, Netherlands, International Search Report of International Application No. PCT/EP2018/075344, dated Jan. 31, 2019, 2 pages.

*Primary Examiner* — Maceeh Anwari
(74) *Attorney, Agent, or Firm* — Dickinson Wright PLLC

(57) ABSTRACT

In a method for determining an axle load on a mechanically and/or pneumatically/hydraulically suspended vehicle, the axle load is determined with the aid of control and sensor means that are installed in the vehicle and/or functionally enhanced. Functions for axle load determination at mechanically suspended vehicle axles (4) and for axle load determination at pneumatically/hydraulically suspended vehicle axles (2) are available. In a mechanically suspended vehicle axle (4) a distance measuring unit (9), and in a pneumatically/hydraulically suspended vehicle axle (2) a pressure measuring unit (7) are used to determine the axle load. An initial plausibility check is implemented in an electronic control unit (10) of the level control system (1), on the basis of which the level control system (1) identifies the particular suspension type, mechanical or pneumatic/hydraulic, of a vehicle axle (2, 4) and, thereafter, the appropriate function for axle load determination is activated.

10 Claims, 2 Drawing Sheets

(52) U.S. Cl.
CPC .............. *B60G 2400/51222* (2013.01); *B60G 2400/60* (2013.01); *B60G 2500/20* (2013.01)

(56) References Cited

U.S. PATENT DOCUMENTS

| | | | |
|---|---|---|---|
| 2008/0269986 A1 | 10/2008 | Regnell et al. | |
| 2010/0036561 A1* | 2/2010 | Jung | B60W 40/10 |
| | | | 701/37 |
| 2019/0100068 A1* | 4/2019 | Tong | B60G 17/018 |
| 2019/0105952 A1* | 4/2019 | Padula | B60C 23/00354 |
| 2020/0264064 A1* | 8/2020 | Iwama | B60G 17/052 |

FOREIGN PATENT DOCUMENTS

| | | |
|---|---|---|
| DE | 102013000874 A1 | 7/2014 |
| DE | 102016004721 A1 | 2/2017 |
| EP | 1167094 A1 | 1/2002 |
| EP | 2097278 A1 | 9/2009 |

\* cited by examiner

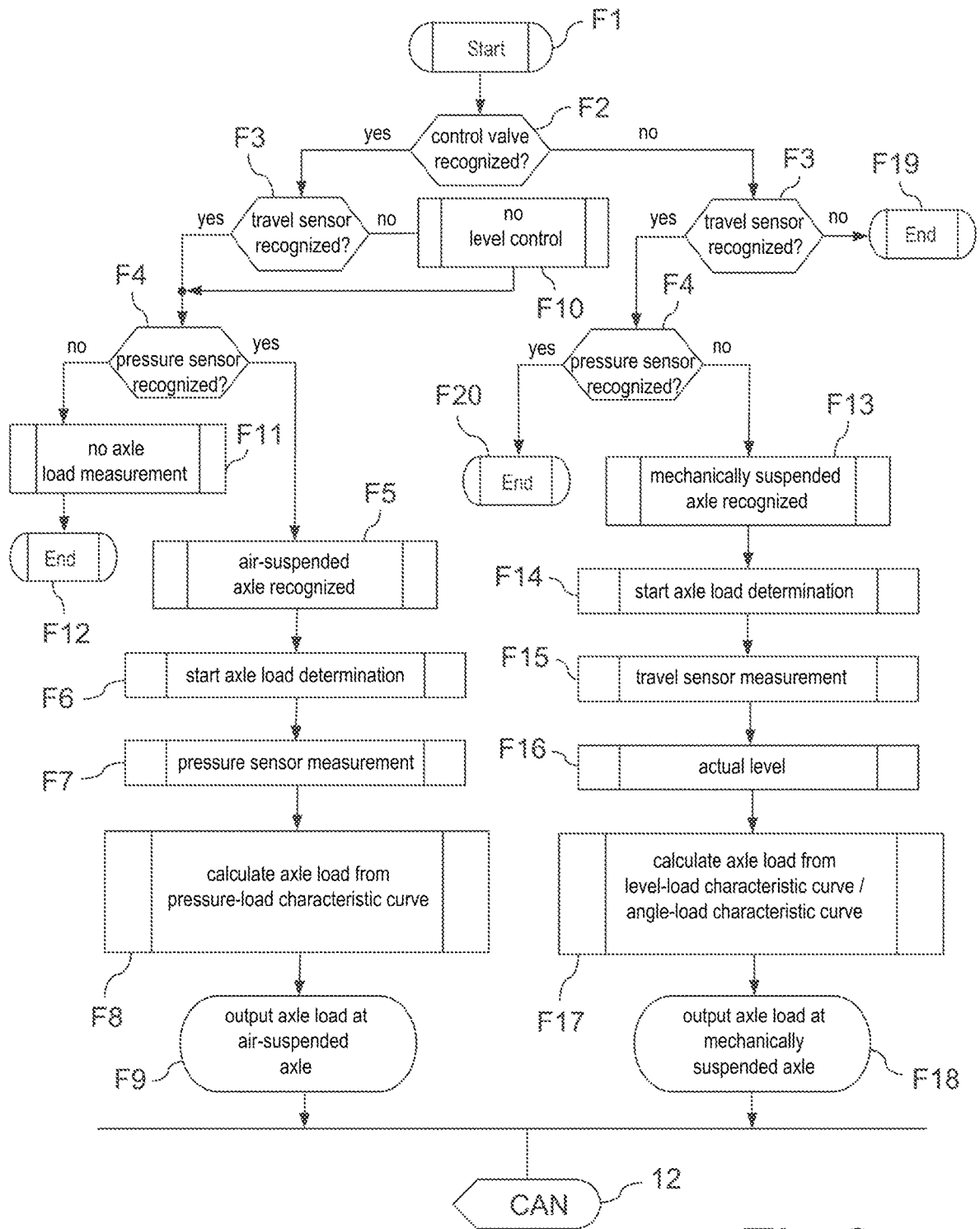

METHOD AND DEVICE FOR DETERMINING AN AXLE LOAD ON A SUSPENDED VEHICLE

TECHNICAL FIELD

The invention relates to a method for determining an axle load on a mechanically and/or pneumatically/hydraulically suspended vehicle. The invention also relates to a device for carrying out such a method, a control unit suitable for this, a correspondingly designed level control system, and a vehicle comprising such units.

BACKGROUND

The determination of the axle load on vehicles is utilized in order to display and monitor the load condition of the vehicle. As a result, dangerous overloads as well as unfavorable weight distributions on the vehicle are to be avoided. In particular in commercial vehicles, the installation of overload displays, which display overloads, is already mandatory or will become mandatory in the future.

Electronically controlled air suspensions for level control in vehicles are already known, which have enhanced functions, in the case of which the axle load on air-suspended axles can also be determined. Such a system is, for example, the modularly designed ECAS system (Electronically Controlled Air Suspension), which is described in the company publication from WABCO GmbH entitled "ECAS im Motorwagen", 2nd edition, 2007, and which has been utilized for a long time in commercial vehicles, such as trucks, buses, trailer vehicles, or even in passenger cars.

Such an electronic air suspension system is essentially made up of multiple adjustable air spring elements designed as support bellows, an electronic control unit, which can be integrated into a data bus system (CAN), a distance measuring unit for detecting distance quantities for a level determination, a control valve unit for actuating the air spring elements, and an operating unit for the user. In the case of commercial vehicles such as trucks and buses, this air suspension system provides for a level control in order to facilitate the loading and unloading of a vehicle. In particular in the case of trailer vehicles, a consistent body height and an improved free-running condition of the tires can be achieved during every loading.

Such a system mostly allows for the selection of multiple engageable ride heights, i.e., a certain distance value from a vehicle superstructure to one or multiple vehicle axles. In addition to a normal level for the driving operation, which can be established by the vehicle manufacturer, further levels, for example, for the height adjustment of a tractor-trailer, for improving stability at high speeds, or for fuel economy, can be selectable. Due to the control of the air suspension, an automatic correction of the particular preset ride height takes place during operation. For this purpose, a permanent comparison of an actual level with a setpoint level is carried out during travel. If the actual level during travel exceeds a predefined tolerance threshold of the setpoint level in the positive or negative direction and, therefore, is presently located outside a tolerance range of the level adjustment, the control unit adapts the actual level to the setpoint level once more by activating the valve circuit and appropriately inflating/deflating one or multiple support bellows. If a change occurs to the default value for the setpoint level, a corresponding activation of the valve circuit also takes place, wherein a response time of the system is to be taken into account.

In addition, systems such as the aforementioned ECAS can comprise one or multiple pressure sensor(s), on the basis of whose measured values, for example, a lifting axle can be actuated, a starting aid can be regulated, the traction of the vehicle can be controlled, or a tire impression can be compensated for. A signal is transmitted to the control unit if the permissible axle load is exceeded or fallen below. These systems are designed, however, only for determining the axle load on air-suspended axles, i.e., on pneumatically or, if necessary, hydraulically suspended axles, but not on steel spring-suspended, i.e., mechanically suspended axles.

EP 2 097 278 B1 describes a method, with the aid of which an axle load display of an ECAS level control system can be calibrated via an operating unit. The method is provided for a commercial vehicle comprising bellows springs for pneumatic level control.

DE 10 2013 000 874 A1 describes a method for displaying the axle load of a vehicle, in which axle loads below a permissible maximum, upon reaching the maximum, and if this maximum is exceeded, are displayed using different signals in each case. The method is designed to be carried out on an air-suspended vehicle.

On mechanically suspended vehicle axles, on the other hand, travel sensors are utilized in place of pressure sensors for determining the axle load. The axle load determination is based on the measurement of a spring deflection of a spring element, with the aid of which a vehicle axle or individual vehicle wheels is/are resiliently coupled to a vehicle superstructure. The travel sensor is generally located on the vehicle superstructure in the proximity of the vehicle axle, whose axle load is to be measured. The travel sensor is connected via a lever to the particular axle, wherein, with the aid of the travel sensor designed as an angle-of-rotation sensor, a rotary motion of the lever can be detected and, on the basis thereof, an axle load can be inferred.

DE 10 2016 004 721 A1 describes a measuring unit for measuring an axle load on a vehicle, comprising at least one mechanical spring element, via which an axle is resiliently coupled to a vehicle superstructure. The measuring unit comprises an angle-of-rotation sensor and a multi-arm transmission gearing, which converts a relative movement of the spring element into a rotary motion, which is measured with the aid of the angle-of-rotation sensor. On the basis of the spring constant of the spring element and the measured compression, the force acting on the vehicle axles can be ascertained, whereby the axle load of the vehicle can be determined.

In addition, on-board weighing systems, such as Air-Weigh™, are already known, which can be installed into vehicles comprising different suspension systems or comprising a mixed suspension. These are separate devices, however, which only determine the axle load. An additional system, such as the ECAS, is then necessary for a level control.

The known systems for axle load determination are provided either only for pneumatically/hydraulically suspended vehicles or only for mechanically suspended vehicles, or they are separate units specifically for determining vehicle weight without level control. The appropriate system of sensors, measuring units, and controllers or even two independent systems must therefore be installed for differently sprung vehicles and for vehicles with or without level control. Due to the overload displays that will become mandatory in the future anyway for both suspension types, this increases the costs to the manufacturer, since the corresponding systems for both types must be refined and maintained. For mixed-suspension vehicles, which are, for example, steel spring-suspended per se or comprise one or multiple air-suspended additional axles, which are to additionally enable a load control, particularly high costs result, in order to be able to measure and display the axle load on all axles and, if necessary, regulate the vehicle level.

SUMMARY

Against this background, the present disclosure provides a method of the type mentioned at the outset, with the aid of which, on the one hand, at least an axle load determination can be carried out on mechanically suspended vehicles and, on the other hand, an axle load determination with the option of a load control can be carried out on pneumatically/hydraulically suspended or mixed-suspension vehicles. The present disclosure further provides a device, which enables this method to be carried out with the aid of largely uniform components and, in addition, is economical to manufacture. In particular, this method and this device are to be suitable for use in a commercial vehicle.

The present disclosure is based on the finding that an air spring-level control system for vehicles, which is already available per se anyway, basically comprises all components that are necessary for an axle load measuring system and, in fact, regardless of the type of the suspension of the vehicle. Such a system can be adapted and enhanced with comparatively little outlay. As a result, a cost-saving potential results for overload displays in pneumatically/hydraulically or mechanically suspended or mixed-suspension vehicles.

The present disclosure therefore initially relates to a method for determining an axle load on a mechanically and/or pneumatically/hydraulically suspended vehicle. As the solution to the method-related problem, the invention provides that the axle load is determined with the aid of control means and sensor means provided for an electronically controlled pneumatic/hydraulic level control system, wherein these control and sensor means are installed in the vehicle and/or are functionally enhanced in such a way that, in addition to a level control or in place of a level control, functions for axle load determination at mechanically suspended vehicle axles and for axle load determination at pneumatically/hydraulically suspended vehicle axles are available, wherein the axle load determination takes place at a mechanically suspended vehicle axle with the aid of a distance measuring unit, wherein the axle load determination takes place at a pneumatically/hydraulically suspended vehicle axle with the aid of a pressure measuring unit, and wherein, initially, a plausibility check implemented in an electronic control unit of the level control system is carried out, on the basis of which the level control system identifies the particular suspension type, mechanical or pneumatic/hydraulic, of a vehicle axle and, thereafter, the appropriate function for axle load determination is activated.

The utilized term "mechanical suspension" is usually understood to mean a steel-spring suspension. In principle, a mechanical suspension can comprise, in place of steel springs, springs made of other materials, such as other alloys or composite materials. When mention is made here of steel spring-suspended axles, this is not to include a limitation of the invention to mechanical springs made of this material. When mention is made of air-suspended vehicle axles, the same can be applied to hydraulically suspended axles. A pneumatic/hydraulic suspension is understood to be a suspension that can be based either on air springs (pneumatic) or on liquid springs (hydraulic).

As mentioned at the outset, the designation "ECAS" is an abbreviation for Electronically Controlled Air Suspension.

Due to the invention, an integrated axle load measuring system is made available, which can determine the axle load on the axles of a vehicle regardless of pneumatically/hydraulically or mechanically designed suspension. The method according to the invention therefore allows for an axle load determination on mechanically suspended, air-suspended, or mixed-suspension vehicles with the aid of uniform components, which are based on a known air spring-level control system. Therefore, a control unit of an air spring-level control system is enhanced with respect to software in such a way that, besides the existing functions of the level control at the air suspension and the axle load determination at air-suspended axles, the axle load determination can now also be carried out at mechanically suspended axles with the aid of this control unit. The same control unit is therefore able to measure the axle load, for example, on steel spring- or air-suspended axles.

For this purpose, such travel sensors are utilized at the mechanically suspended axles that are usually utilized for level control at the air-suspended axles, while the axle load determination at the air-suspended axles is carried out as usual with the aid of pressure sensors. Therefore, only travel sensors and/or pressure sensors of the type provided for an air spring-level control system are necessary for axle load determination at the vehicle axles. In other words: The axle load determination at the mechanically suspended axles does not require any new components; the same travel sensors provided for level control for the air spring-level control system can also be installed for axle load determination at the mechanically suspended axles. All that is necessary is to adapt the software of the control unit.

Therefore, in order to determine the axle load in a vehicle equipped exclusively with mechanically suspended axles, only one control unit—modified according to the invention—of an air spring-level control system as well as at least one travel sensor of such a system is necessary for each axle. In the case of a mixed-suspension vehicle, for the purpose of axle load determination, a control unit modified according to the invention as well as at least one travel sensor per mechanically suspended axle and, as previously, at least one pressure sensor per air-suspended axle are necessary. In an exclusively air-suspended vehicle, for the purpose of axle load determination, the previous control unit of the air spring-level control system can be utilized unchanged or, alternatively, a control unit modified according to the invention, and at least one pressure sensor per axle, as previously, can be utilized. Regardless thereof, the air spring-level control system can perform its main function of level control at the air-suspended axles, of course.

The particular advantage of the invention, therefore, is that a uniform system is utilized for all vehicles, regardless of whether they are suspended or whether a level control is provided. This provides considerable cost-saving potential. In particular, the outlay required for implementing an axle load measuring system and for an overload display for commercial vehicles of both suspension types is standardized, whereby a cost savings to the user of vehicles equipped in this way as well as to the manufacturer of the vehicles can be achieved.

A plausibility check is provided so that malfunctions are avoided and, for each vehicle axle, the particular correct function for the axle load determination at this axle is called up in the control unit. This can take place, according to one embodiment of the invention, with the aid of a simple component check, namely due to the fact that the plausibility check comprises a detection of the presence of a control valve unit, a distance measuring unit, and a pressure measuring unit at the particular vehicle axle, wherein a mechanically suspended vehicle axle is inferred when there is no control valve signal and no pressure sensor signal at associated inputs or outputs of the control unit of the level control system, or the control valve signal and the pressure sensor signal have the value zero over a predetermined time period of the vehicle operation, and a travel sensor signal is present or such a travel sensor signal has a value unequal to zero, and a pneumatically/hydraulically suspended vehicle axle is inferred when a control valve signal and a pressure sensor signal are stringently present and a travel sensor signal is optionally present at associated inputs or outputs of the control unit of the level control system or have a value unequal to zero over a predetermined time period of the vehicle operation.

In an air spring-level control system, as is known, control valves designed as solenoid valves are mostly installed for level control at air-suspended axles via a pressure regulation of the support bellows, and pressure sensors as well, which are utilized for determining the axle load on these axles. If these components and/or their output signals are lacking and, additionally, a travel sensor signal is detected, the presence of a mechanically suspended axle can be inferred. On the other hand, if control valve signals as well as pressure signals and, possibly, travel sensor signals are received, an air-suspended axle can be inferred. In practical application, a travel sensor is generally also present at an air-suspended axle, since this is necessary for level control. For the axle load determination per se, on the other hand, the travel sensor at the air-suspended axle would not be absolutely necessary.

The function for axle load determination at a mechanically suspended vehicle axle can be carried out, according to one embodiment of the invention, including at least the following steps:

selecting and activating the function for axle load determination at a mechanically suspended vehicle axle on the basis of a plausibility check, detecting an axle load-dependent distance between the particular vehicle axle and a vehicle superstructure with the aid of at least one travel sensor installed at the particular mechanically suspended vehicle axle and determining an actual level on the basis of the detected measuring signal, calculating the axle load on the mechanically suspended vehicle axle on the basis of this actual level with the aid of a computational algorithm, which evaluates at least one level/axle load characteristic curve or quantities derived therefrom, wherein the computational algorithm is implemented in the electronic control unit and the characteristic curve is stored in a memory of this control unit, and outputting the determined axle load on the mechanically suspended vehicle axle on a data bus and/or forwarding this to an axle load display unit and, optionally, outputting the determined actual level at the mechanically suspended vehicle axle on the data bus.

In a conventional level control system, a distance measurement was previously always carried out at a vehicle axle only for the case in which an air suspension is present on this vehicle axle. This coupling is now dispensed with. With the aid of the invention, it is therefore possible, if a support bellows is present at an air-suspended axle, to utilize the measured distance of a travel sensor for height adjustment and, if a support bellows and a control valve inflating or deflating the support bellows are lacking, i.e., in the case of a mechanically suspended axle, to convert the measured distance to an axle load with the aid of a level/axle load characteristic curve. Due to the distance measurement at the mechanically suspended axle, the vehicle level at this axle is also available on the data bus and can be incorporated, for example, into a level control function at the air-suspended axles as additional information.

Alternatively, the function for the axle load determination at a mechanically suspended vehicle axle can be carried out, according to one further embodiment of the invention, including at least the following steps:

selecting and activating a function for axle load determination at a mechanically suspended vehicle axle on the basis of a plausibility check, detecting an axle load-dependent angle of a lever device, which articulatedly connects the particular vehicle axle and the vehicle superstructure, between the particular vehicle axle and the vehicle superstructure with the aid of an angle-of-rotation sensor associated with the travel sensor, calculating the axle load on the mechanically suspended vehicle axle on the basis of this angle with the aid of a computational algorithm, which evaluates at least one angle/axle load characteristic curve or quantities derived therefrom, wherein the computational algorithm is implemented in the electronic control unit and the characteristic curve is stored in a memory of this control unit, and outputting the determined axle load on the mechanically suspended vehicle axle on a data bus and/or forwarding this to an axle load display unit.

Therefore, the measured values of an angle-of-rotation sensor on the lever mechanism between the axle and the body can also be utilized as a direct output signal of the travel sensor for calculating axle load with the aid of an angle/axle load characteristic curve. As a result, the axle load can be determined and made available particularly quickly.

The functions for the axle load determination at a pneumatically/hydraulically suspended vehicle axle can be carried out, according to another embodiment of the invention, including at least the following steps:

selecting and activating a function for axle load determination at a pneumatically/hydraulically suspended vehicle axle on the basis of the plausibility check, detecting an axle load-dependent pressure value with the aid of at least one pressure sensor installed at the particular pneumatically/hydraulically suspended vehicle axle, calculating the axle load on the pneumatically/hydraulically suspended vehicle axle on the basis of this pressure value with the aid of a computational algorithm, which evaluates at least one pressure/axle load characteristic curve or quantities derived therefrom, wherein the computational algorithm is implemented in the electronic control unit and the characteristic curve is stored in a memory of this control unit, and outputting the determined axle load on the pneumatically/hydraulically suspended vehicle axle on a data bus and/or forwarding this to an axle load display unit.

Therefore, advantageously, a function for axle load determination at the pneumatically/hydraulically suspended vehicle axles is available, as previously. The plausibility check according to the invention is merely carried out upstream.

It is advantageous when the method is carried out repeatedly at certain time intervals or when at least the particular sensor signals are detected multiple times over a predetermined time period and, on the basis thereof, time-averaged output signals are formed. As a result, the accuracy and reliability of the determined axle load values can be increased. At the least, the method should be carried out every time after the control unit of the level control system is newly switched on. As a result, an operational readiness of the system as specified is ensured.

The invention is directed to solving the device-related problem of a device for determining an axle load on a mechanically and/or pneumatically/hydraulically suspended vehicle. According to the invention, it is provided with respect to this device that a level control system, which is uniformly designed for mechanically or pneumatically/hydraulically suspended or mixed-suspension vehicles is arranged with an integrated axle load measuring system, including an electronic control unit in which computational algorithms are implemented for a plausibility check for identifying the particular suspension type of a vehicle axle and for calculating the axle load on these vehicle axles on the basis of sensor measuring signals detected at the vehicle axles and comparing these with characteristic curves stored in a memory, wherein associated with the control unit for each mechanically suspended vehicle axle is at least one travel sensor installed at the vehicle axle, and wherein associated with the control unit for each pneumatically/hydraulically suspended vehicle axle is at least one pressure sensor installed at the particular vehicle axle.

Therefore, an existing control unit of an ECAS level control system can also be advantageously utilized for vehicle applications, in which the vehicle comprises no air springs, i.e., also no support bellows, control valves, or pressure sensors, or in which the vehicle comprises not only air-suspended axles with these components, but also mechanically suspended axles without these components. The control unit is merely modified and enhanced with respect to the software in such a way that the axle load can also be determined on these mechanically suspended axles, in that the control unit detects measured values of travel sensors installed on the mechanically suspended axles and converts these to axle load values.

The control unit detects this application when no signals from pressure sensors and control valves at and/or for these axles are present or these signals have the value zero. The axle load is determined at the air-suspended axles with the aid of the pressure sensors, as previously. The control unit therefore provides axle load values of air-suspended axles and/or mechanically suspended axles depending on the type of suspension with which the vehicle is equipped.

The invention therefore also encompasses the described electronic unit, which is designed for carrying out the method presented.

Finally, the invention also relates to a level control system for level control and for axle load determination at mechanically and/or pneumatically/hydraulically suspended vehicle axles, which are designed according to the device claim and, cumulatively, can be operated in order to carry out a method according to at least one of the method claims, and to a vehicle, such as a commercial vehicle or a passenger car, comprising such a level control system.

The invention is explained in greater detail in the following by reference to an exemplary embodiment represented in the attached drawings.

BRIEF DESCRIPTION OF THE DRAWINGS

In the drawings:

FIG. 2 shows a flow chart of one embodiment of a method according to the invention for determining an axle load on a mixed-suspension vehicle according to FIG. 1.

DETAILED DESCRIPTION OF THE DRAWINGS

Figure 1:
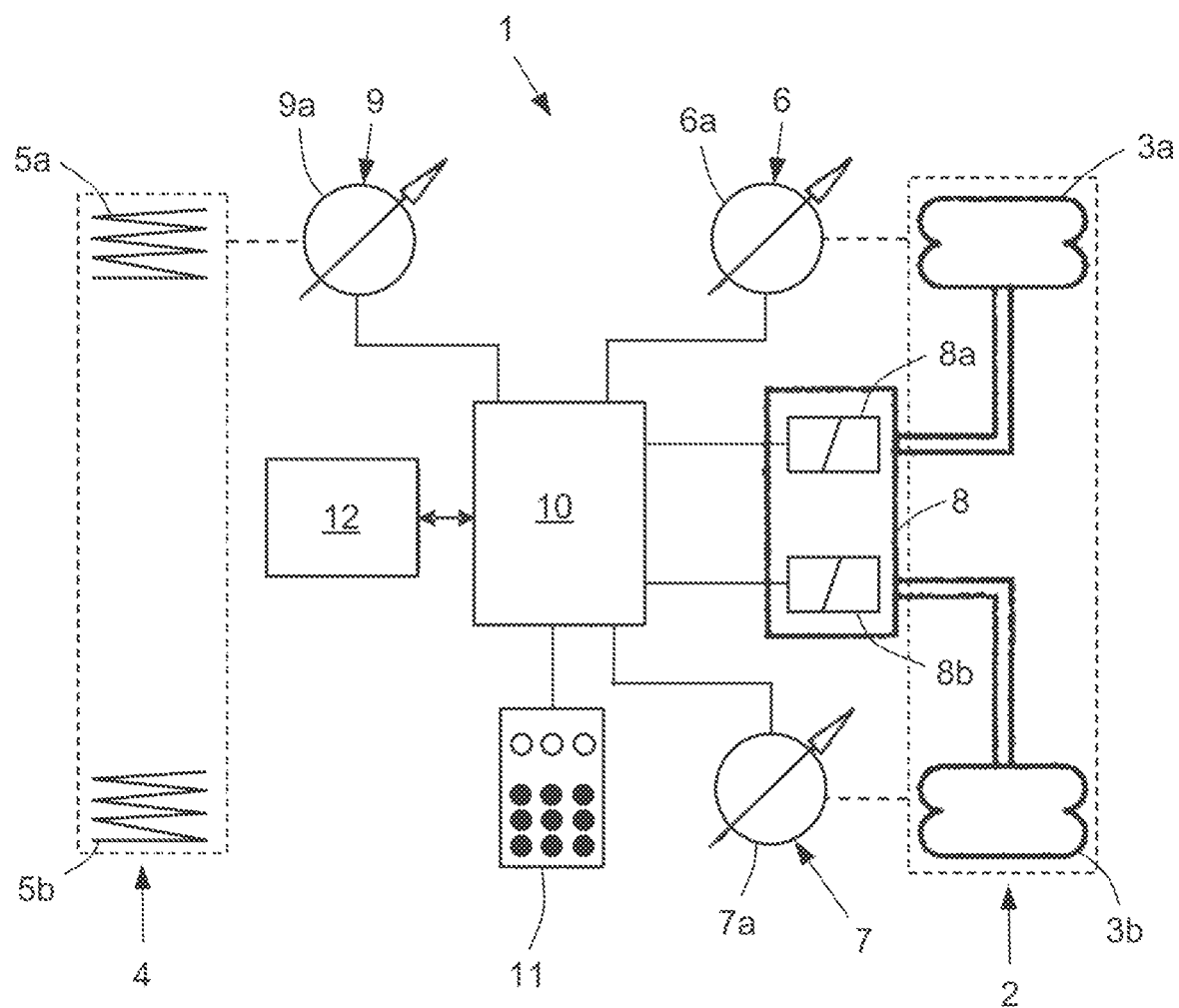
FIG. 1 shows a level control system, represented in a highly schematically simplified manner, which is designed for axle load determination and for level control on a vehicle equipped with mechanically and pneumatically suspended axles.

The level control system 1—represented in a simplified manner in FIG. 1—of a vehicle, for example, an ECAS system, for example, of a truck, comprises two adjustable air spring elements 3a, 3b designed as support bellows for a resilient support of a vehicle superstructure (not represented) with respect to a rear vehicle axle 2 designed as a drive axle. On the other hand, a front vehicle axle 4 is supported with respect to the vehicle superstructure via two steel-spring elements 5a, 5b designed as helical compression springs.

Associated with the pneumatically/hydraulically suspended, in the present case air-suspended, rear vehicle axle 2 are a first distance measuring unit 6 comprising at least one first travel sensor 6a for detecting distance quantities for a level determination, a pressure measuring unit 7 comprising at least one pressure sensor 7a for detecting pressure values for an axle load determination at this axle 2, and a control valve unit 8 designed as a valve circuit, comprising one control valve 8a, 8b, designed as a solenoid valve, for each air spring element 3a, 3b, respectively. The control valve unit 8 is switchably pneumatically connected to the air spring elements 3a, 3b and comprises a compressed air connection (not described in greater detail). Associated with the mechanically suspended, in the present case steel spring-suspended, front vehicle axle 4 is a second distance measuring unit 9 comprising at least one second travel sensor 9a for an axle load determination at this axle 4.

In addition, an electronic control unit 10 is arranged between the vehicle superstructure and the air-suspended vehicle axle 2 for evaluating the measured distance values and the measured pressure values and for controlling the air spring elements 3a, 3b in order to adjust a ride height between the vehicle superstructure and the air-suspended vehicle axle 2. In addition, an operating unit 11 for a particular user is electrically connected to the control unit 10. At the operating unit 11, the user can enter settings and perform a calibration of the level control system 1, for example, as described in EP 2 097 278 B1. The valve circuit 8 and the two distance measuring units 6, 9 as well as the pressure measuring unit 7 are connected to the control unit 10 for the purpose of signal transmission. The control unit 10 comprises a CAN controller, via which the control unit 10 is connected to a CAN bus 12. The CAN controller controls interrupt requests and regulates the data transfer. The configuration of a CAN bus in a vehicle as well as the connection of various bus users to the CAN bus are known.

The first travel sensor 6a and the second travel sensor 9a are each attached to the vehicle superstructure in the proximity of their associated vehicle axle 2, 4, respectively, and are connected to the vehicle axle 2, 4 via a lever system (not represented). The travel sensors 6a, 9a each comprise an angle-of-rotation sensor (not represented), which detects the particular angular position of the aforementioned lever system. The rotary motion of the lever system can be converted, in the interior of the travel sensor 6a, 9a, into a linear motion, for example, in the form of the plunging of an armature into a coil, wherein, during the plunging motion of the ferromagnetic armature into the fixed coil, a displacement-dependent phase shift between current and voltage arises, which is made available as an output signal, which the control unit 10 receives. On the basis of this signal, an actual level of the distance between the particular vehicle axle 2, 4 and the vehicle superstructure can be determined. The value of the actual level can be utilized for level control at the air-suspended vehicle axle 2.

The value of the actual level is utilized for axle load determination at the mechanically suspended vehicle axle 4, as described in the following. The axle load determination at the mechanically suspended vehicle axle 4 makes use of the simple relationship that, on the basis of the spring constant of the spring element 5*a*, 5*b* and the measured compression, the force acting upon the vehicle axle 4 is determined, whereby the axle load of the vehicle can be determined with the aid of a simple characteristic curve. An axle load determination at an air-suspended vehicle axle 2 is not readily possible with the aid of a distance measuring unit 6. Therefore, the axle load is usually determined at an air-suspended vehicle axle 2 with the aid of a pressure measuring unit 7.

A level control of an air suspension with the aid of such a system is known per se. Usually, a travel sensor for level control detects the distance between the vehicle axle and the vehicle superstructure at certain time intervals, for example, every 100 ms. The ascertained measured value is the actual value of a control circuit and is forwarded to the control unit 10. In the control unit 10, this actual value is compared to a setpoint value specified in the control unit 10. If there is an impermissible difference between the actual value and the setpoint value, an actuating signal is transmitted from the control unit 10 to a solenoid valve. Depending on this actuating signal, the solenoid valve now activates the support bellows and inflates or deflates it. Due to the pressure change in the support bellows, the distance between the vehicle axle and the vehicle superstructure also changes. The distance is detected again by the travel sensor and the cycle starts over from the beginning.

The following explanation is limited to the sequence of a method according to the invention for determining an axle load, on the one hand, at the mechanically suspended vehicle axle 4 and, on the other hand, at the air-suspended vehicle axle 2. FIG. 2 is utilized for explaining the method. Accordingly, a flow chart is represented in FIG. 2, comprising function blocks F1 through F20 of method steps for determining an axle load at the air-suspended vehicle axle 2 and at the mechanically suspended vehicle axle 4.

The method starts with the activation of the level control system 1, for example, when an ignition system of the vehicle is switched on in a first function block F1. Initially, an axle-specific plausibility check takes place including three component queries, on the basis of which the program branches into two program branches. These are a first routine, which determines the axle load at the air-suspended vehicle axle 2, and a second routine, which determines the axle load at the mechanically suspended vehicle axle 4.

The plausibility check begins with a first query F2, specifically whether a signal of a control valve 8*a*, 8*b* unequal to zero is present in a predetermined time period. A second query F3 follows, specifically whether a signal of a travel sensor 6*a*, 9*a* unequal to zero is present in a predetermined time period. Thereafter, a third query F4 follows, specifically whether a signal of a pressure sensor 7*a* unequal to zero is present in a predetermined time period. These queries are carried out similarly at each vehicle axle 2, 4 and their associated components.

If a control valve signal, a travel sensor signal, and a pressure sensor signal are present, the air-suspended vehicle axle 2 is identified in block F5 and the associated routine for axle load determination starts in block F6. In block F7, the pressure sensor signal is read out. In block F8, the axle load on the air-suspended vehicle axle 2 is determined with the aid of a pressure/axle load characteristic curve stored in a memory of the control unit 10 and, in block F9, is sent to the CAN bus 12.

The axle load information regarding the air-suspended vehicle axle 2 can be displayed to the driver with the aid of a display and/or utilized by other electronic control systems. If a travel sensor signal is not detected, even though a control valve signal is present, level control is not possible on the air-suspended vehicle axle 2 according to block F10.

If a pressure sensor signal is not registered, even though a control valve signal and a travel sensor signal are present, an axle load measurement cannot take place at the air-suspended vehicle axle 2 according to block F11 and the routine on the air-suspended vehicle axle 2 ends in block F12.

If, in block F2, there is no control valve signal, but there is a travel sensor signal in block F3 and, however, no pressure sensor signal in block F4, the mechanically suspended vehicle axle 2 is identified in block F13 and the associated routine for axle load determination starts in block F14. In block F15, the travel sensor signal and/or the angle-of-rotation sensor signal are/is read out. In block F16, the actual level is determined on the basis thereof. In block F17, the axle load on the mechanically suspended vehicle axle 4 is determined with the aid of a level/axle load characteristic curve stored in a memory of the control unit 10 and in which the measured actual level is correlated with the axle load, or with the aid of an angle/axle load characteristic curve in which the measured angle of rotation of the angle-of-rotation sensor is correlated with the axle load and, in block F18, is sent to the CAN bus 12.

The axle load information regarding the mechanically suspended vehicle axle 4 can be displayed to the driver via a display and/or utilized by other electronic control systems.

Therefore, the pieces of axle load information regarding all vehicle axles 2, 4 are available. If no control valve signal and no travel sensor signal are detected, the routine ends in block F19. If a pressure sensor signal is registered, even though no control valve signal is present, there is an error and the routine ends in block F20.

The routines of the method can be carried out on any number of vehicle axles for mechanically or pneumatically/hydraulically suspended or mix-suspension vehicles.

The invention claimed is:

1. A method for determining an axle load of a suspended vehicle with at least one of a mechanical, pneumatic, or hydraulic suspension, the method comprising the following steps:

automatically determining the axle load using an electronic control unit (10) and a plurality of sensor units (6, 7, 9) provided for an electronically controlled pneumatic or hydraulic level control system (1), wherein the control and sensor units are installed in the vehicle and/or are functionally enhanced in such a way that, in addition to a level control or in place of a level control, functions are available at the electronic control unit for automatic axle load determination at mechanically suspended vehicle axles (4) and for automatic axle load determination at pneumatically or hydraulically suspended vehicle axles (2), wherein the axle load determination takes place automatically at a mechanically suspended vehicle axle (4) using a distance measuring unit (9) of the plurality of sensor units, wherein the axle load determination takes place automatically at a pneumatically or hydraulically suspended vehicle axle (2) using a pressure measuring unit (7) of the plurality of sensor units, performing, initially, a plausibility check implemented in the electronic control unit (10) of the level control system (1), automatically identifying, on the basis of the plausibility check, a particular suspension type, and automatically distinguishing between a mechanical suspension and a pneumatic or hydraulic suspension, of a vehicle axle (2, 4), and, thereafter, at the electronic control unit, activating an appropriate function of the functions available at the electronic control unit and automatically determining the axle load using a characteristic curve stored in the electronic control unit.

2. The method according to claim 1, wherein the plausibility check comprises the steps of:

monitoring for a presence of a signal from a control valve unit (8), the distance measuring unit (6, 9), and the pressure measuring unit (7) at a particular vehicle axle (2, 4), wherein a mechanically suspended vehicle axle (4) is inferred whenever one of the following conditions is present:

there is no control valve signal from the control valve unit and no pressure sensor signal from the pressure measuring unit at associated inputs or outputs of the electronic control unit (10) of the level control system (1), the control valve signal and the pressure sensor signal have a value of zero over a predetermined time period of the vehicle operation, and a travel sensor signal from the distance measure unit is present, or the travel sensor signal has a value unequal to zero, wherein a pneumatically or hydraulically suspended vehicle axle (2) is inferred whenever one of the following conditions is present:

the control valve signal and a pressure sensor signal are stringently present at the associated inputs or outputs of the control unit (10) of the level control system (1), or the control valve signal and the pressure sensor signal have a value unequal to zero over a predetermined time period of the vehicle operation.

3. The method according to claim 1, comprising at least the following steps:

at the control unit, automatically selecting and activating the function for axle load determination at a mechanically suspended vehicle axle (4) on the basis of the plausibility check, detecting an axle load-dependent distance between the particular vehicle axle (4) and a vehicle superstructure using at least one travel sensor (9, 9a) of the plurality of sensor units installed at a particular mechanically suspended vehicle axle (4) and determining an actual level on the basis of a detected measuring signal from the at least one travel sensor, automatically calculating a calculated axle load on the mechanically suspended vehicle axle (4) on the basis of the actual level using a computational algorithm, which evaluates at least one characteristic curve being at least one of a level characteristic curve and an axle load characteristic curve or quantities derived therefrom, wherein the computational algorithm is implemented in the electronic control unit (10) and the at least one characteristic curve is stored in a memory of the control unit (10), outputting the calculated axle load on the mechanically suspended vehicle axle (4) on a data bus (12) and outputting the determined actual level at the mechanically suspended vehicle axle (4) on the data bus; and forwarding at least the calculated axle load on the mechanically suspended vehicle axle to an axle load display unit and displaying at least the calculated axle load on the mechanically suspended vehicle axle on the axle load display unit.

4. The method according to claim 1, further comprising the following steps:

at the electronic control unit, selecting and activating a function for axle load determination at a mechanically suspended vehicle axle (4) on the basis of the plausibility check, detecting an axle load-dependent angle of a lever device, which articulately connects the mechanically suspended vehicle axle (4) and the vehicle superstructure, between the mechanically suspended vehicle axle (4) and the vehicle superstructure using an angle-of-rotation sensor associated with a travel sensor (9, 9a) of the plurality of sensor units, automatically calculating a calculated axle load on the mechanically suspended vehicle axle (4) on the basis of the axle load-dependent angle using a computational algorithm, which evaluates at least one angle/axle load characteristic curve or quantities derived therefrom, wherein the computational algorithm is implemented in the electronic control unit (10) and the angle/axle load characteristic curve is stored in a memory of the electronic control unit (10), outputting the calculated axle load on the mechanically suspended vehicle axle (4) on a data bus (12), and forwarding the calculated axle load to an axle load display unit and displaying the calculated axle load on the mechanically suspended vehicle axle on the axle load display unit.

5. The method according to claim 1, further comprising the following steps:

at the electronic control unit, automatically selecting and activating the function for axle load determination at a pneumatically or hydraulically suspended vehicle axle (2) on the basis of the plausibility check, at the electronic control unit automatically detecting an axle load-dependent pressure value using at least one pressure sensor (7, 7a) of the plurality of sensor units installed at the pneumatically or hydraulically suspended vehicle axle (2), automatically calculating a calculated axle load on the pneumatically or hydraulically suspended vehicle axle (2) on the basis of the pressure value using a computational algorithm, which evaluates at least one pressure/axle load characteristic curve or quantities derived therefrom, wherein the computational algorithm is implemented in the electronic control unit (10) and the characteristic curve is stored in a memory of the electronic control unit (10), and outputting the calculated axle load on the pneumatically or hydraulically suspended vehicle axle (2) on a data bus (12), and forwarding the calculated axle load to an axle load display unit and displaying the calculated axle load on the pneumatically or hydraulically suspended vehicle axle on the axle load display unit.

6. The method as claimed in claim 1, wherein the method is carried out repeatedly and time-averaged output signals are formed.

7. A device for determining an axle load on a suspended vehicle, comprising:
a level control system (1) configured for mechanically suspended axles and pneumatically or hydraulically suspended axles or mixed-suspension vehicles, and
an integrated axle load measuring system, including an electronic control unit (10) in which computational algorithms are implemented and configured to perform a plausibility check that identifies a suspension type of a vehicle axle (2, 4) on the basis of signals received at the electronic control unit (10), the electronic control unit further configured to calculate a calculated axle load on these vehicle axles (2, 4) on the basis of sensor measuring signals detected at the vehicle axles (2, 4) and further configured to automatically compare the sensor measuring signals with characteristic curves stored in a memory of the electronic control unit based on the suspension type identified by the plausibility check, wherein associated with the control unit (10) for each of the mechanically suspended vehicle axles (4) is at least one travel sensor (9, 9a) installed at the mechanically suspended vehicle axle (4), and wherein associated with the control unit (10) for each of the pneumatically or hydraulically suspended vehicle axles (2) is at least one pressure sensor (7, 7a) installed at the pneumatically or hydraulically suspended vehicle axle (2);
wherein the electronic control unit automatically identifies the suspension type of the vehicle axle as either a mechanical suspension or a pneumatic or hydraulic suspension and, in response to automatically identifying the suspension type, automatically calculates the axle load using the characteristic curve associated with the suspension type identified and the sensor measuring signals detected at the axle.

8. The method of claim 1, wherein the level control system (1) of the vehicle includes a pressure sensor at each of the hydraulically or pneumatically suspended vehicle axles and a travel sensor at each of the mechanically suspended vehicle axles.

9. An electronic control unit (10), configured to carry out, by executing a program stored in the electronic control unit, a method for determining an axle load of a suspended vehicle with at least one of a mechanical, pneumatic, or hydraulic suspension, the method comprising the following steps:
automatically determining the axle load using the electronic control unit (10) and a plurality of sensor units (6, 7, 9) provided for an electronically controlled pneumatic or hydraulic level control system (1), wherein the control and sensor units are installed in the vehicle and/or are functionally enhanced in such a way that, in addition to a level control or in place of a level control, functions are available at the electronic control unit for automatic axle load determination at mechanically suspended vehicle axles (4) and for automatic axle load determination at pneumatically or hydraulically suspended vehicle axles (2), wherein the axle load determination takes place automatically at a mechanically suspended vehicle axle (4) using a distance measuring unit (9) of the plurality of sensor units, wherein the axle load determination takes place automatically at a pneumatically or hydraulically suspended vehicle axle (2) using a pressure measuring unit (7) of the plurality of sensor units,
performing, initially, a plausibility check implemented in the electronic control unit (10) of the level control system (1),
automatically identifying, on the basis of the plausibility check, a particular suspension type, and automatically distinguishing between a mechanical suspension and a pneumatic or hydraulic suspension, of a vehicle axle (2, 4), and,
thereafter, at the electronic control unit, activating an appropriate function of the functions available at the electronic control unit and automatically determining the axle load using a characteristic curve stored in the electronic control unit.

10. The device as claimed in claim 7, wherein the device is installed in a vehicle, wherein the vehicle is a commercial vehicle or a passenger car.

* * * * *